Feb. 27, 1962  A. J. WILTSHIRE  3,023,135
LAMINATED FIBER GLASS RADOME AND METHOD OF MAKING SAME
Filed June 5, 1957  8 Sheets-Sheet 1

INVENTOR.
ARTHUR J WILTSHIRE
BY
W. G. Sullivan
ATTORNEY

Feb. 27, 1962     A. J. WILTSHIRE     3,023,135
LAMINATED FIBER GLASS RADOME AND METHOD OF MAKING SAME
Filed June 5, 1957     8 Sheets-Sheet 4

INVENTOR.
ARTHUR J. WILTSHIRE
BY
W. G. Sullivan
ATTORNEY

Feb. 27, 1962 A. J. WILTSHIRE 3,023,135
LAMINATED FIBER GLASS RADOME AND METHOD OF MAKING SAME
Filed June 5, 1957 8 Sheets-Sheet 5

INVENTOR.
ARTHUR J. WILTSHIRE
BY
W. G. Sullivan
ATTORNEY

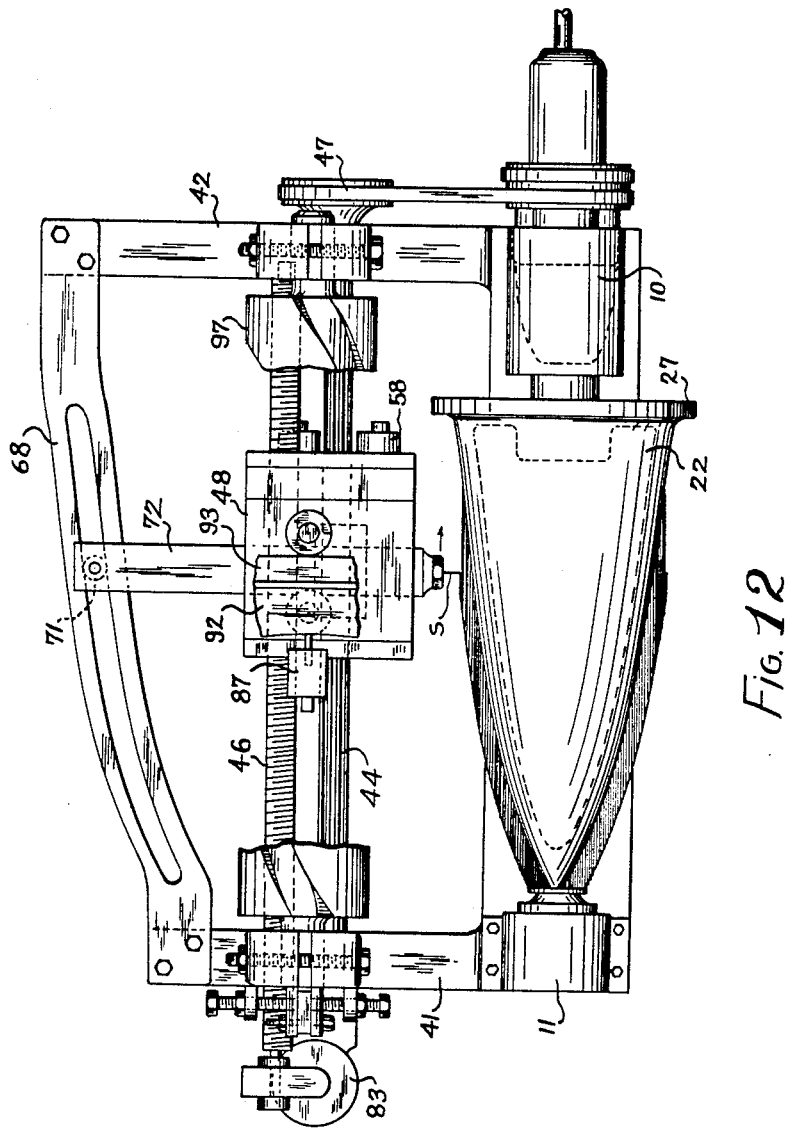

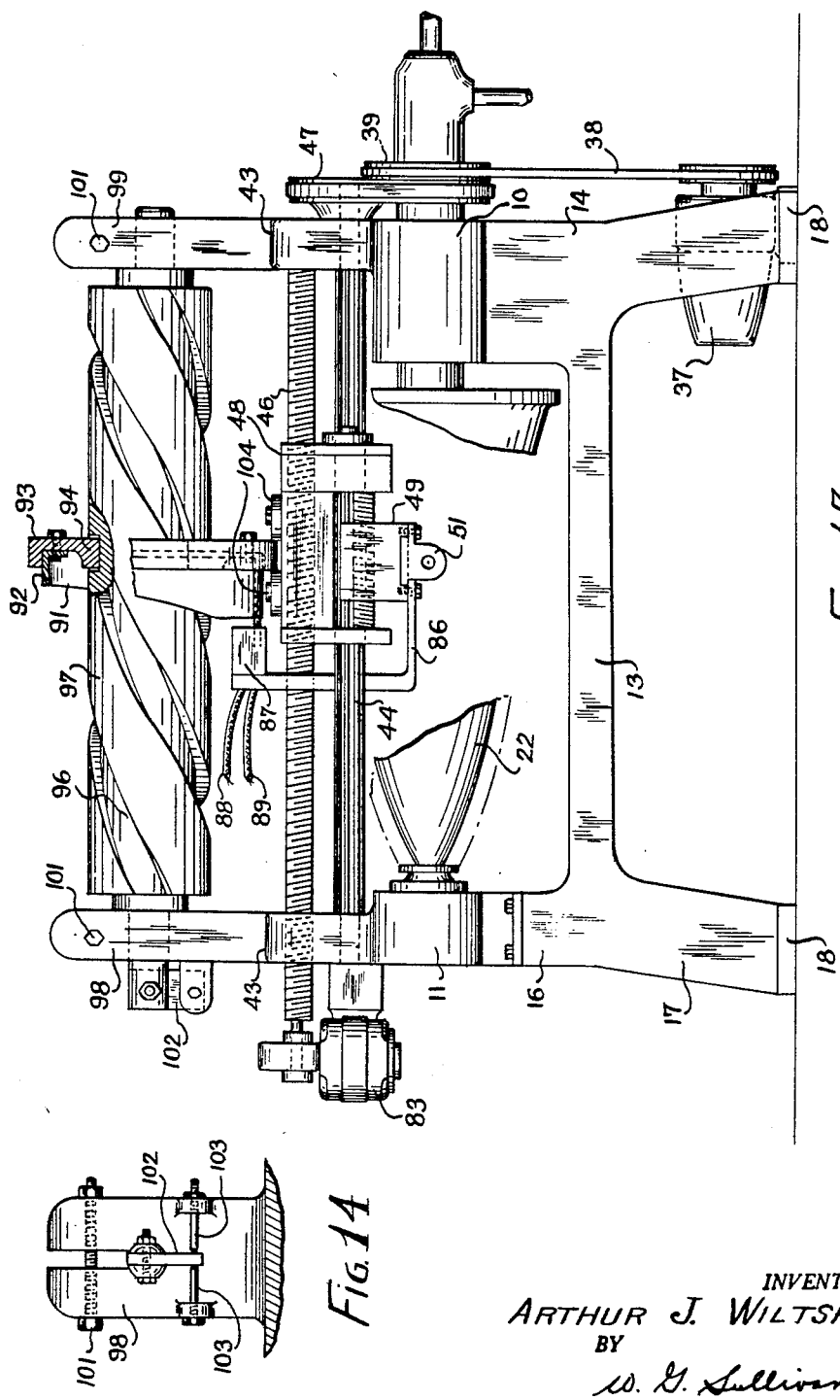

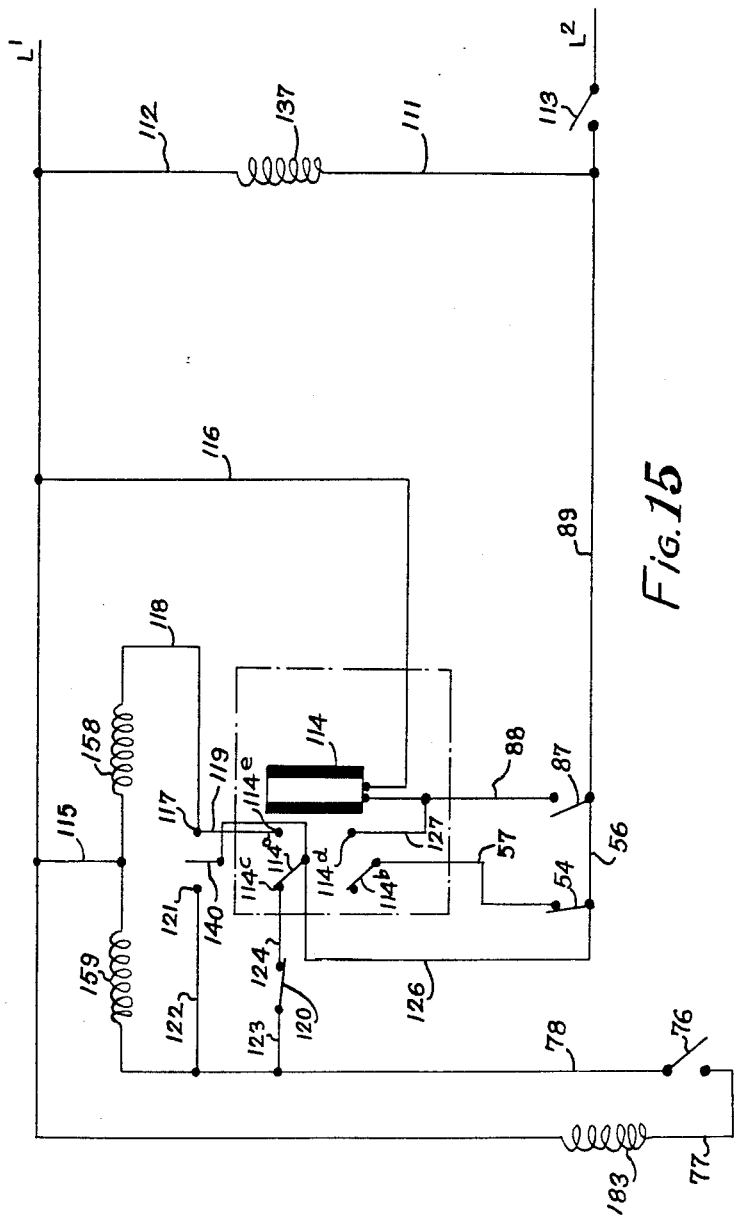

3,023,135
LAMINATED FIBER GLASS RADOME AND METHOD OF MAKING SAME

Arthur J. Wiltshire, Cleveland, Ohio, assignor to White Sewing Machine Corporation, Lakewood, Ohio, a corporation of Delaware
Filed June 5, 1957. Ser. No. 663,784
5 Claims. (Cl. 154—43)

This invention relates to radomes and methods of making the same, and more particularly to a radome formed of fiber glass and a bonding resin.

As is well known, a radome is a housing which is transparent to electromagnetic radiation at microwave frequencies and designed to protect the antenna of radar apparatus from external influences that are likely to damage the antenna or interfere with its performance. Such external influences include wind loading, moisture and the like. As a housing, particularly for high-speed aircraft and missile applications, numerous non-electrical design factors must be considered.

From the standpoint of electrical design it would be preferable in most cases to dispense with a radome although for high power applications the electrical design requires operation of the antenna at greater than atmospheric pressures and in this case the radome serves as a pressure envelope. The presence of a radome in the path of the beam may seriously interfere with operation of the radar in a number of ways such as:

(a) Distortion of the antenna pattern by refraction, particularly if supporting ribs are required.

(b) Loss of beam power due to front and back surface reflection.

(c) Loss of beam power due to absorption.

(d) Apparent target shift due to reflection or refraction.

Any transparent structure in the path of the beam may distort the beam, reflect part of it or absorb part of it and assuming that the external shape of the radome is determined by aerodynamic or other non-electrical considerations and that the minimum thickness depends on the strength requirements, good electrical design dictates that the material be both homogeneous and uniformly thick.

From an electromagnetic standpoint a transparent material is characterized by two properties, dielectric constant and loss tangent. The first of these helps to determine the electrical thickness, and hence the refractive properties of the material. The second is a measure of the absorption of the material.

I am aware that radomes have been made by molding conventional woven fiber glass cloth over a form and coating the cloth with a liquid resin whereby upon subsequent hardening of the resin a rigid housing will be formed. This method and the radome so formed have several serious disadvantages. First, the method is relatively slow and is not adaptable to rapid quantity production by automatic forming equipment. Second, the percentage of resin is relatively high since the resin fills the interstices of the fiber glass cloth. It is highly desirable that the percentage of glass be relatively high since an increase in the glass-to-resin ratio will increase the dielectric constant and decrease the loss tangent. The resultant decrease in power loss due to absorption is highly desirable. Third, due to the generally bullet shape of a radome for aircraft and the like applications it cannot be formed of a single sheet of fiber glass cloth without overlap or wrinkles and when formed of a number of layers there is an undesirable concentration of resin or glass at the butt or lap joints resulting in distortion.

I have devised a method of forming a radome made of fiber glass and a bonding resin which eliminates the aforementioned disadvantages. According to the invention, I provide a heated rotatable mandrel of generally bullet shape or having an external surface generally corresponding to a surface of revolution formed by rotating a parabola about its axis (i.e., a paraboloid shape). A level wind mechanism is associated with the mandrel and is adapted to feed a built up roving of continuous fiber glass to the mandrel in a direction generally at right angles to the mandrel axis. The free end of the roving or fiber glass strand is cemented or tied to the nose or small end of the mandrel and as the mandrel is rotated the feed needle is caused to have a short traverse or reciprocating stroke winding several convolutions at a small pitch around the mandrel and then reversing its axial direction of feed. As successive windings or horizontal layers are applied the traverse or stroke is gradually increased extending from a surface of revolution corresponding generally to the external surface of the finished radome to the sloping or curved external surface of the mandrel. Prior to being fed to the mandrel the strand is coated with a suitable bonding agent, preferably a heat hardenable thermosetting resin in liquid form, and the resin on the strand portions which contact the heated mandrel tends to immediately harden or set thereby bonding the portions in this zone together and this curing action subsequently extends to strand portions more remote from the mandrel. The traverse is automatically controlled to extend from the said surface of revolution to the mandrel external surface and in axially extending layers until a desired wall thickness in a radial direction is built up on the nose end of the mandrel. In this manner the tapered nose portion of the wall is formed of cylindrical fiber glass sections, each having inner and outer surfaces coaxial with the axis of the mandrel, successive cylindrical sections being telescopically arranged and offset lengthwise with respect to one another, with the rearward portion of the outer surface of one section being surrounded by the forward portion of the next adjacent larger diameter section.

Subsequently the feed mechanism is automatically shifted slightly towards the large end of the mandrel and the level winding is continued with the traverse stroke being gradually increased in extent but terminating at said surface of revolution. When a desired wall thickness in this zone is attained the feed mechanism is again automatically inched towards the large end of the mandrel and this process is continued with the traverse gradually increasing. Near the large end of the mandrel the traverse stroke decreases and the winding action is discontinued when the wall at the large end of the mandrel is of a desired thickness.

Relatively quick bonding together of the successive strand layer portions in contact with the heated mandrel and outwardly thereof prevents any tendency of successive layers or windings to slide towards the nose or small end of the mandrel. The fiber glass strand is fed under low tension insuring a tight compact winding and also forcing excess resin radially outwardly resulting in a homogeneous wall having a desirable high glass-to-resin ratio. By the above described process a radome having a wall of generally uniform thickness can be provided but it is contemplated that at least the external surface of the wall will be finish ground to remove any coating of excess resin as well as irregular build up of glass and insure a wall of uniform thickness within close tolerances.

A radome formed as described will provide a relatively light weight housing having the necessary mechanical strength without ribs and supporting structure, will have low aerodynamic drag, temperature stability, low water absorption, low loss tangent or low power loss due to absorption since it can be fabricated from low loss tangent resins, a desired shape can be formed to close tolerance, and a homogeneous wall structure of uniform thickness and having a high glass-to-resin ratio can be provided. Also the radome is adapted to serve as a pressure envelope where high power applications require pressures above atmosphere.

It is a primary object of the invention to provide a radome formed of fiber glass and a bonding material and having improved electrical and structural characteristics.

Another object of the invention is to provide a radome adapted to effect minimum loss of beam power.

Another object of the invention is to provide a radome adapted to effect minimum distortion of the antenna pattern or minimum apparent target shift.

Another object of the invention is to provide a method of forming a radome of the above type.

Another object of the invention is to provide apparatus for forming a radome of the above type.

Other objects of the invention and the invention itself will become increasingly apparent from a consideration of the following description and drawings wherein:

FIGURE 12 is a fragmentary top plan view of the winding machine showing the means controlling the travel of the reciprocating block to the right during winding;

FIGURE 13 is a front elevational view of the winding machine with parts broken away further illustrating the means controlling travel of the reciprocating block to the right;

FIGURE 14 is a fragmentary right end elevational view showing adjustment means for the barrel helix illustrated in FIGURE 13; and FIGURE 15 is a wiring diagram showing the hook-up of the motors, switches, clutches and relay.

Figure 4:
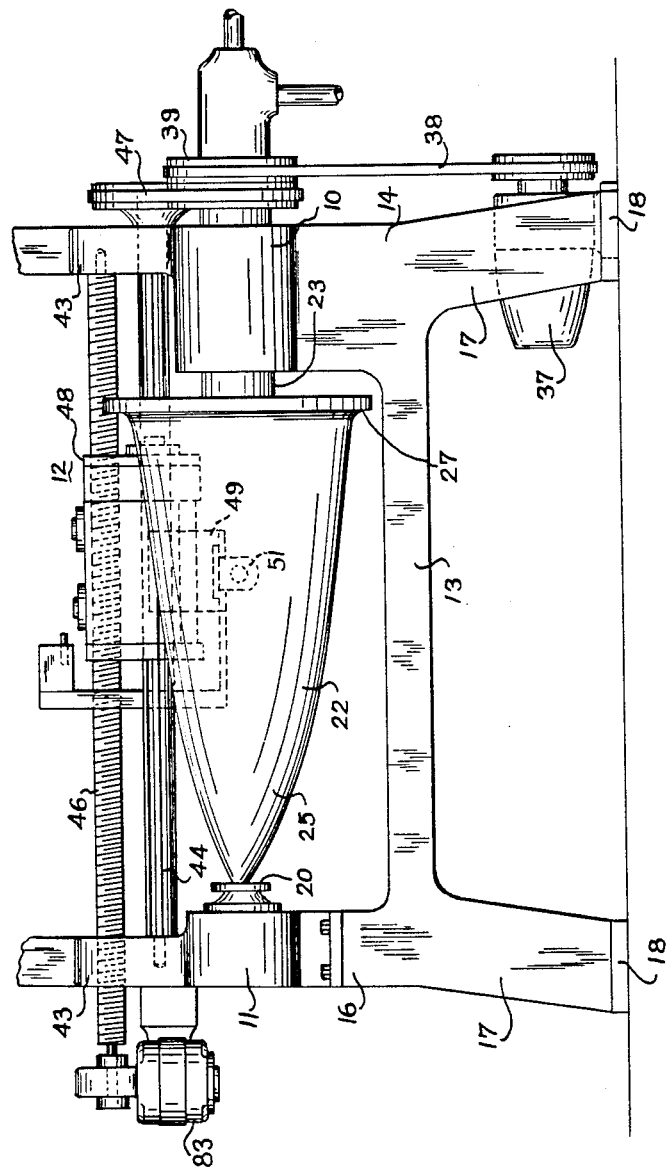
FIGURE 4 is a front elevational view of a winding machine, I preferably employ, with upper parts omitted.
Figure 5:
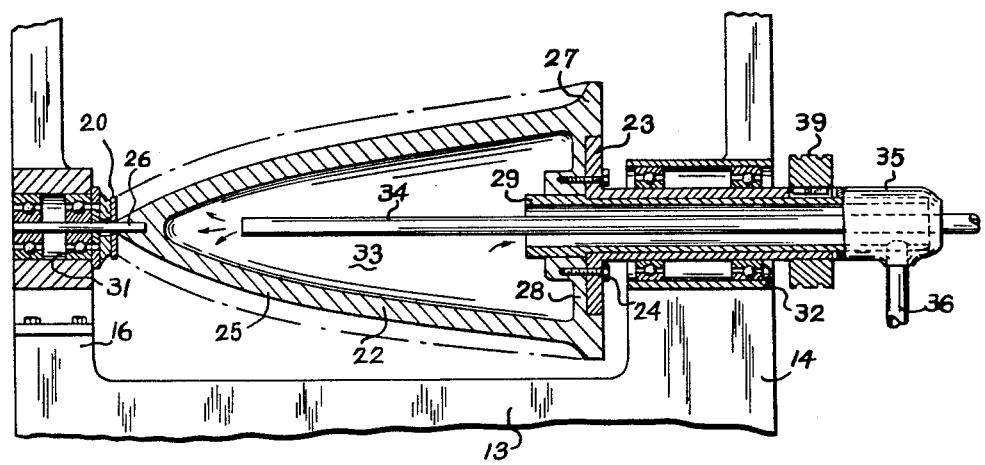
FIGURE 5 is a fragmentary view, partially in section, showing the manner of rotatably supporting and heating a mandrel about which the radome is formed.

Referring now to the drawings, particularly FIGURES 4, 5 and 13, I preferably employ a winding machine similar to a lathe in having a head stock 10, a tail stock 11 and a longitudinally movable feed mechanism 12, all supported by a base 13. The base and associated parts are preferably formed of cast metal providing an upstanding end frame 14 supporting head stock 10, an upstanding end frame 16 supporting tail stock 11 and legs 17 framed with floor pads 18. A mandrel 22 is supported between the head stock and tail stock and is adapted to be rotated by a flanged shaft 23 (FIGURE 5) to which it is detachably secured as by bolts 24.

Referring to FIGURE 5, the mandrel 22 preferably formed of cast steel comprises a curved wall 25 terminating at its nose or small end in a solid portion provided with an axial opening to receive a supporting spindle 26. The opposite or large end of the mandrel terminates in a radially outwardly extending flange 27 and axially inboard of this flange is a radially inwardly extending flange 28 having a recess to receive the flange end of shaft 23 and centrally perforated to receive a tube 29 press fitted therein. Spindle 26 and shaft 23 are rotatably mounted in relatively heavy ball bearings indicated at 31 and 32 whereby the mandrel 22 can be rotated without danger of axial misalignment. It will be noted that a cavity 33 is formed within the mandrel and a pipe 34 extends into the cavity through a revolving joint or coupling 35. Pipe 34 is adapted to be connected to a steam supply source whereby steam can heat mandrel 22 and condensate can be discharged through tube 29 and a depending line 36 from joint 35. Tube 29 revolves with mandrel 22 and pipe 34 which projects through joint 35 and is sealed therewith against steam leakage is non-rotatable. The rotatable end of tube 29 which extends into the housing of joint 35 has a flange which engages the flat face of a carbon seal flexing against a ball sphere and pressure is maintained by an expansion thrust member. Revolving joints or couplings of this type are well known and only a brief description is given herein.

Figure 6:
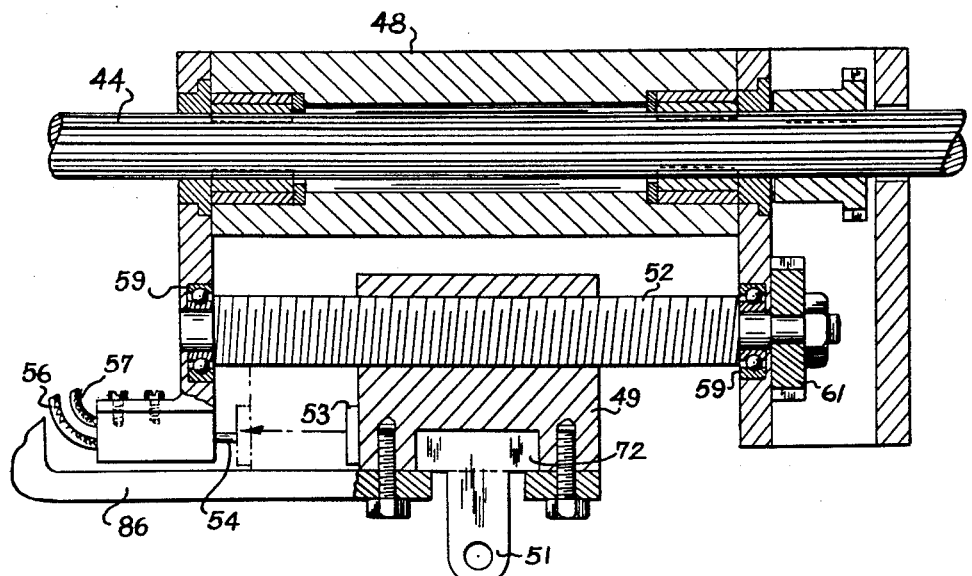
FIGURE 6 is an enlarged fragmentary sectional view of the winding head and reciprocating block illustrated in FIGURE 4.
Figure 10:
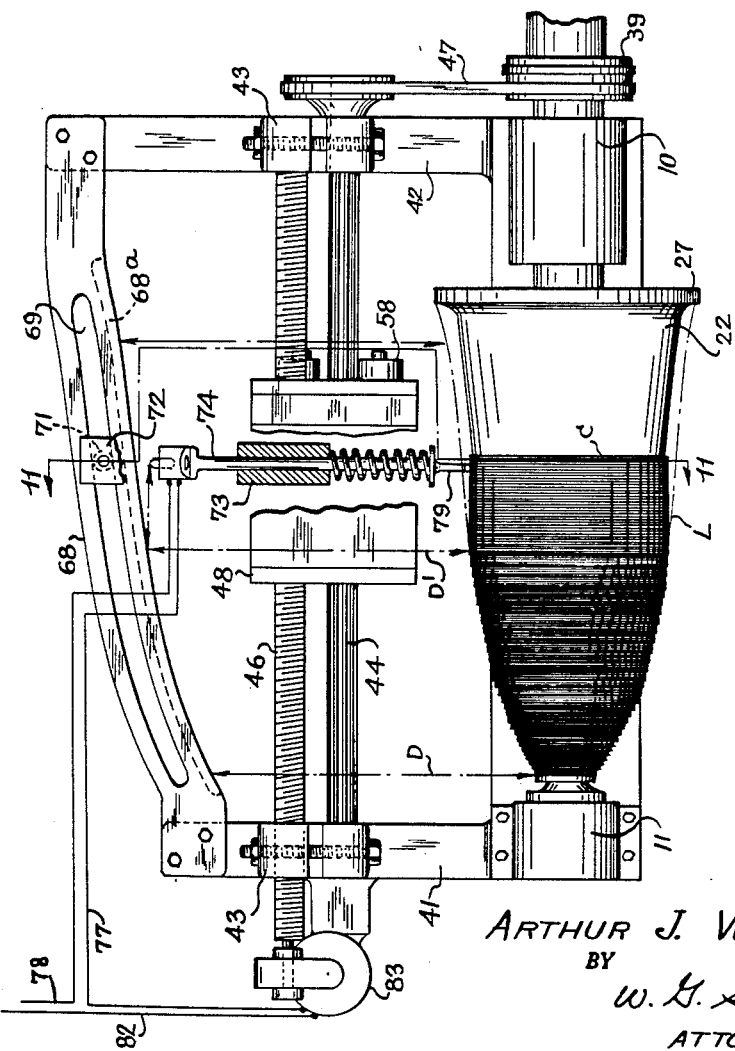
FIGURE 10 is a top plan view, partially in section, showing the means for inching the winding head axially to the right relative to the mandrel.

Referring now to FIGURES 4, 6 and 10 the manner of feeding a fiber glass roving or strand to the mandrel 22 will now be explained. A main motor 37 through a belt drive 38 drives a pulley 39 which is coupled to shaft 23 whereby mandrel 22 can be rotated at relatively high speed. Lateral arms 41 and 42 extending from the machine frame have bearings 43 mounted thereon in which a splined shaft 44 and a threaded shaft 46 are journaled. Shaft 44 is rotatable by pulley 39 through a belt 47. Mounted on shafts 44 and 46 is a longitudinally movable winding head generally indicated at 48 which carries a reciprocating block 49. Mounted in block 49 is a winding eye 51 through which the fiber glass strand feeds to mandrel 22. The block is carried by a reversible screw 52 having a pitch of approximately .050 inch and is provided with a plate 53 adapted to contact a limit switch 54 and stop movement of block 49 to the left. A pair of flexible electrical leads 56 and 57 extend from switch 54 to an electric clutch device mounted on winding head 48 and generally indicated at 58.

Referring now to FIGURES 6 to 9, inclusive, the manner of effecting reversing movement of block 49 will now be described. Screw 52 is rotatably mounted in depending arms of the winding head 48, preferably by roller or ball bearings 59, and a gear 61 is fixed to one end of the screw. Gear 61 directly meshes with a gear 62 and through an idler gear 65 is operatively connected with a gear 64. Gear 62 is fixed to a short shaft 62a which has a disc form rotor 62b fixed thereto. Telescoped over shaft 62a with a sliding fit is a tubular shaft 63a which has a gear 63 fixed thereto. A disc form armature plate 63b is splined to shaft 63a and is permitted limited axial movement relative to the shaft. Rotor 62b has a fixed magnetic coil associated therewith whereby when the coil is energized the armature plate 63b is attracted to engage facing material on the rotor and drivingly couple shafts 62a and 63a. Electric type clutches are well known for their quick connection and disconnection and I preferably employ a clutch of this type. Gear 63 meshes with a driving gear 66 engaged with spline shaft 44.

Figure 9:
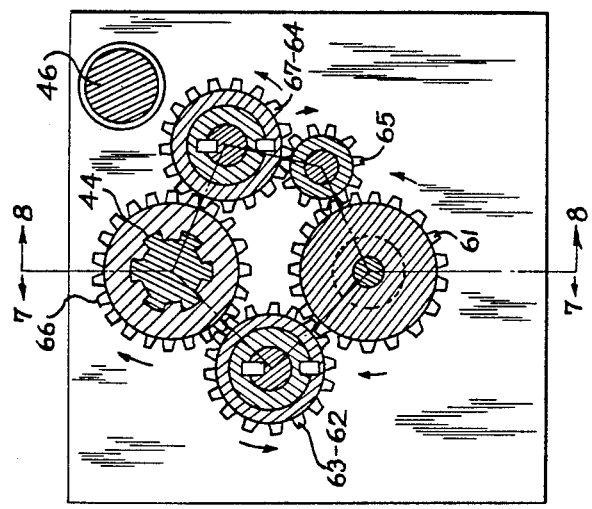
FIGURE 9 is a staggered section taken along the line 9—9 of FIGURES 7 and 8 showing the relation of the various gears effecting movement of the reciprocating block.

As previously explained splined shaft 44 is continuously driven during operation of the winding machine, and, assuming shaft 44 rotates in a clockwise direction, as illustrated in FIGURE 9 when shafts 62a and 63a are coupled, gears 63—62 rotate in a counter-clockwise direction causing gear 61 and screw 52 to rotate in a clockwise direction. Rotation of screw 52 in this manner causes block 49 to move to the left, as viewed in FIGURE 6, or towards limit switch 54. When limit switch 54 is actuated by contact with plate 53 on reciprocating block 49, the coil of the electric clutch is deenergized and the coil of a second similar electric clutch is energized. This second clutch couples shafts indicated at 64a and 67a (FIGURE 8) and resultantly effects driving of gear 64 through a gear 67 which is in mesh with gear 66 on splined shaft 44. This causes rotation of screw 52 in a reverse or counter-clockwise direction thereby moving block 49 to the right (FIGURE 6).

Figure 11:
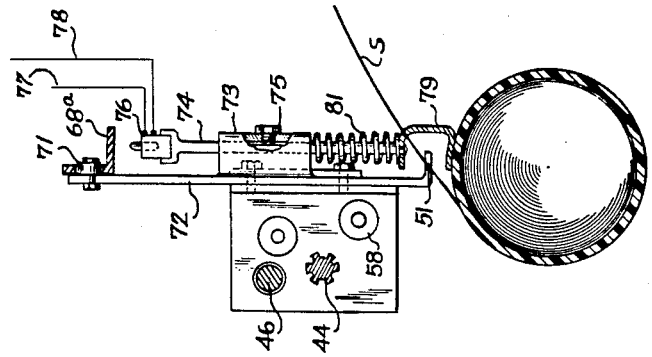
FIGURE 11 is a staggered section taken along the line 11—11 of FIGURE 10.

It will be noted by reference to FIGURE 1 that the length of the traverse stroke varies as the winding head moves axially relative to the mandrel and the manner of controlling the stroke length will be explained after the means for inching or moving the winding head to the right is described. Referring to FIGURES 6, 10 and 11, the arms 41 and 42 which are fixed to the machine frame, support a curved member 68 which has an arcuate slot 69 therein substantially conforming to the contour of the external wall of the finished radome. A roller 71 disposed in the slot is mounted on the outer end of a needle 72 which has its eye 51 formed in a short downturned portion. The needle adjacent the eye portion is slidably supported by reciprocating block 49, preferably by providing a recess in the lower face of the block and attaching plates to the block adapted to engage the lower face of the needle. The needle is formed with an integral sleeve 73 through which a rod 74 is slidably projected, the upper end of the rod being forked to receive a switch 76 having electrical leads 77 and 78 extending therefrom, and the lower end of the rod having a generally U-shaped rider 79 fixed thereto. To prevent twisting of rod 74 I may provide an axial slot therein adapted to receive the stem of a screw 75 mounted in sleeve 73.

A spring 81 abutting sleeve 73 and rider 79 tends to continuously force rod 74 towards the mandrel 22 and when the rod is moved in a reverse direction or towards member 68 the projecting finger of switch 76 is adapted to engage the downturned flange 68a of member 68 and actuate the switch. A power lead 82 is connected to one side of an inching motor 83 and when switch 76 is closed by contact with flange 68a the other power lead 77 is connected to the other side of the motor causing threaded shaft 46 to slowly revolve and inch winding head 48, provided with threads engaging the shaft, axially to the right (FIGURE 10) until switch 76 moves out of contact with flange 68a. Movement of the winding head to the right also moves needle 72, its roller 71 and rider 79 to the right and due to the contour of slot 69 this movement pulls needle 72 outwardly relative to the axis of the mandrel to maintain a constant clearance of needle eye 51 relative to the external surface of the radome as it is being generated. In other words, the needle eye 51 moves along a curved path corresponding to the curvature of slot 69, and, rider 79 which continuously engages the radome surface being generated may move radially relative to the needle eye, but since inching of the winding head to the right is determined by contact of switch 76 with flange 68a, the curvature of the generated radome external surface will generally correspond to the contour of flange 68a. For example, referring to FIGURE 10 if D represents the distance from the generated radome external surface at the small end to flange 68a, the distance D' from the mid zone of the generated radome external surace to the flange 68a and the distance from the large end zone of the generated radome external surface to flange 68a will be substantially the same as D.

Figure 8:
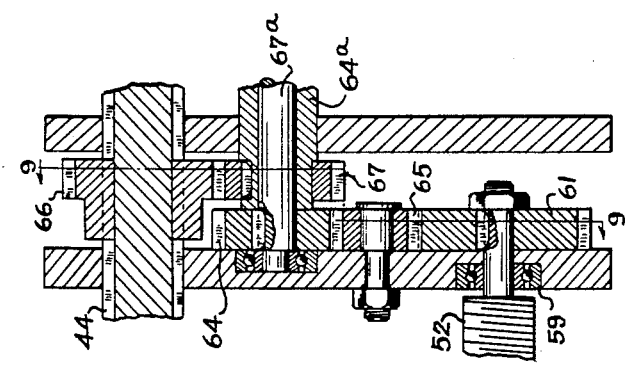
FIGURE 8 is a staggered section taken along the line 8—8 of FIGURE 9 showing the mechanism for effecting movement of the reciprocating block in a reverse direction.
Figure 7:
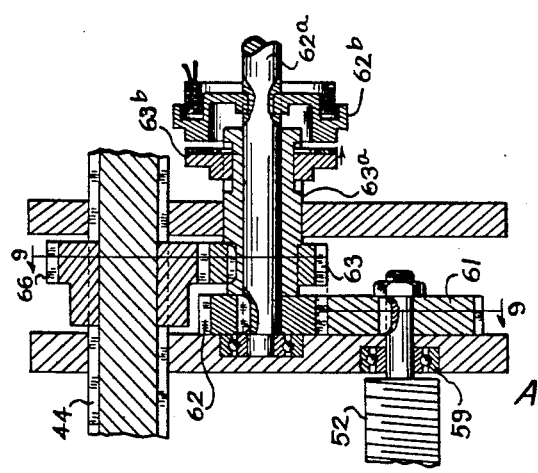
FIGURE 7 is a staggered sectional view taken along the line 7—7 of FIGURE 9 showing mechanism for effecting movement of the reciprocating block in one direction.

The manner of limiting the traverse stroke in its travel to the left has been explained in connection with FIGURE 6 and the manner of limiting the traverse stroke to the right will now be explained in connection with FIGURES 6, 12 and 13. Affixed to reciprocating block 49 is an L-shaped bracket 86 which supports at its upper end a switch 87 provided with electrical leads 88 and 89 for actuating the aforementioned second electric clutch which is adapted to couple shafts 64a and 67a (FIGURE 8). The switch finger is adapted to engage the peripheral edge 91 of a ring form cam 92. It will be noted that the cam edge 91 is curved or terminates at varying distances from a vertical plane, whereby if the cam is rotated 180° from the position shown in FIGURE 13, switch 87 and its cam contacting finger would have to move a greater distance to the right before the switch would be closed to energize its associated electric clutch. This means that the block 49 on which the switch is mounted will correspondingly move a greater distance to the right before the needle eye 51 carrying the fiber glass strand will stop its traverse to the right. Inasmuch as the length of the traverse stroke required at different axially spaced portions of the radome wall can be determined in order to extend from the outer surface of the radome wall to the mandrel external surface, the cam edge 91 can be shaped to effect stopping of the stroke to the right just as the right end strand convolution of a layer contacts the mandrel wall.

To effect rotation of cam 92 and vary the traverse stroke as required for different axially spaced positions of the winding head I mount the cam 92 in a cup shaped member 93 having a hub formed with coarse threads as indicated at 94. These threads engage helical grooves 96 formed in a cylinder (relatively large) 97 or barrel helix. The cylinder is mounted between a pair of posts 98 and 99 extending upwardly from bearing housings 43. Each post is split to tightly engage reduced end portions of the cylinder by means of clamping bolts 101. To provide for slight rotary adjustment of cylinder 97 a lever 102 is secured to one reduced end portion of the cylinder which extends outwardly of post 98. The lower end of the lever engages adjustment screws 103 whereby when the clamping bolts 101 are loosened the cylinder can be rotated slightly in either direction by turning screws 103.

A pair of rollers 104 mounted on the winding head and engaging peripheral front and rear portions of member 93 causes this member and rim cam 92 to move axially with the winding head. Since cylinder 97 is fixed it will be apparent that as the winding head is moved to the right cam 92 will be caused to rotate in a clockwise direction as viewed from the right end. When the contour of the external surface of the mandrel is determined it will be apparent that for any given axial position of the winding head 48 and cam 92 the portion of working cam edge 91 presented to switch 87 can control the position at which block 49 will terminate its movement to the right and start its reverse movement to the left. This position of block 49 determines the position at which the needle eye stops feeding convolutions formed by strand S to the right in a layer. This is illustrated in FIGURE 10 wherein the top or last wound layer is indicated at L and the last convolution of this layer to the right is indicated at C. The cam edge 91 is so designed in relation to the relative rotated position of cam 92 at this point that the needle eye stops its movement to the right substantially when convolution C touches or is wrapped around the mandrel external wall rather than the last preceding layer of windings.

As previously explained the termination of feeding to the left is determined by the position of the winding head since the switch 54 limiting travel to the left is fixed to the winding head. Also as previously explained the winding head is not moved or inched to the right until a desired radome wall thickness is built up at a given position or a thickness sufficient to move rod 74 and actuate switch 76.

Referring to the wiring diagram shown in FIGURE 15, a pair of power leads $L_1$ and $L_2$ have the windings 137 of the main motor 37 connected thereacross by lines 111 and 112 whereby when a manually operable switch 113 is closed the main motor 37 will be energized causing rotation of mandrel 22 and splined shaft 44 in a manner previously described. Switch 54 has one terminal connected to line $L_2$ (when switch 113 is closed) by lines 56 and 89. The other terminal of switch 54 is connected by line 57 to a pole 114b of an electro-magnetic switch generally indicated at 114. The coil of switch 114 is connected to a terminal of switch 87 by line 88 and is also connected to lead $L_1$ by a line 116 whereby when switch 87 is closed switch 114 will be energized and the poles 114a and 114b of the switch will be moved from the full line position shown to engage terminals 114d and 114e. The other terminal of switch 87 is connected to power lead $L_2$ by line 89. It will be noted that switch 114 is of the double throw, double pole type and the poles will be in the full line position shown due to spring force when the switch coils are not energized.

Switch 54 is normally closed and switch 87 is normally open. The coils of the electro-magnetic clutches are indicated at 158 and 159, both coils being connected to lead $L_1$ by a line 115, coil 158 also being connected to a switch terminal 117 by a line 118 and thence to terminal 114e of switch 114 by a line 119, and coil 159 being connected to a switch terminal 121 by a line 122 and to a switch 120 by a line 123. The terminal of switch 120 is connected to a terminal 114c of switch 114 by a line 124. Pole 114a of switch 114 is connected to line 56 by a line 126 and pole 114b is connected to a terminal of switch 54 by line 57.

Coil 158 is associated with electric clutch 58 which is adapted to couple shafts 62a and 63a (FIGURE 7) and effect movement of reciprocating block 49 to the left. Coil 159 is associated with the other electric clutch which is adapted to effect movement of block 49 to the right through coupling shafts 67a and 64a (FIGURE 8).

Assuming switch 113 is closed and the other switches are in the full line positions illustrated in FIGURE 15. Coil 159 will then be energized since current will flow from the coil which is connected to power lead $L_1$ and line 115 through line 123, switch 120, pole 114a and lines 126, 56 and 89 to power lead $L_2$. This effects movement of block 49 to the right and when switch 87 is closed by contact with cam 92 as previously explained the coil of switch 114 will be energized. This causes pole 114a to move out of contact with terminal 114c and into contact with terminal line 114e and also causes pole 114b to move into contact with terminal 114d. Terminal 114d is connected to the coil of switch 114 by the line 127. This has the dual effect of de-energizing coil 159 stopping movement of block 49 of the right and energizing coil 158 starting movement of block 49 to the left. Current will now flow from coil 158 through lines 118 and 119, pole 114a and lines 126, 56 and 89 to power lead $L_2$. When block 49 starts moving to the left switch 87 will open but since switch 54 is closed the coil switch 114 will remain energized since current flows from the coil through line 127, pole 114b, line 57, switch 54 and lines 56 and 89 to power lead $L_2$. After a predetermined movement of block 49 to the left switch 54 will be opened by contact with plate 53 thereby causing de-energization of the coil of switch 114 and again permitting movement of poles 114a and 114b to the full line position shown and resultantly stopping movement of block 49 to the left and starting its reverse movement to the right.

It was previously pointed out that actuation of switch 76 controls inching of the winding head 48 to the right. However, it is not desirable that inching to the right take place when reciprocating block 49 is moving to the left since a relatively large gap might be left between successive windings or convolutions. It will be apparent that if inching of the winding head 48 to the right only occurs when block 49 stops and starts moving to the right, a close under winding occurs with the gap caused by inching being disposed directly above the close under winding.

Figure 1:
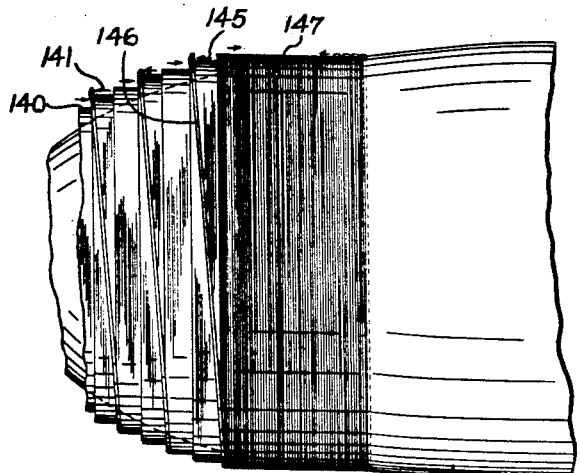
FIGURE 1 is a fragmentary elevational view showing the manner of applying successive layer windings in forming a radome embodying the invention.

Referring to FIGURE 1 if 145 represents a layer which has been wound by movement of block 49 to the left and switch 76 is in contact with flange 68a inching will occur at termination of winding to the left and convolution 146 has a relatively large helix angle due to the inching action. Convolution 146 is the initial convolution of the next layer formed by winding to the right. The close winding is then continued as indicated at 147 immediately following the inching movement. This prevents inching on an under winding which might result in undesirable resin deposits. Accordingly, I have provided means whereby inching can only occur when coil 159 is energized. The windings 183 of the inching motor 83 are connected to 76 (FIGURES 10 and 11) by electrical lead 77 and the switch is connected to coil 159 by electrical lead 78. The other terminal of the inching motor windings 183 is connected to power lead $L_1$. It will be apparent that the only time inching can occur is when the switch 114 has its poles in the full line position illustrated in FIGURE 15 or when coil 159 is energized thereby effecting movement of block 49 to the right. When coil 158 is energized the circuit to inching motor 83 is broken even though switch 76 is closed.

The foregoing description in connection with the winding diagram relates to automatic operation but as will be subsequently explained it may be desirable to control movement of block 49 by manual operation. Accordingly I provide manually operable switch 120 and it will be apparent that when this switch is open the circuit through coil 158 is broken. Assuming switch 120 is open, I provide a manually operable double throw switch 140, whereby, when the switch arm engages terminal 117, coil 158 will be energized and when the switch arm engages terminal 121 coil 159 will be energized.

Figure 2:
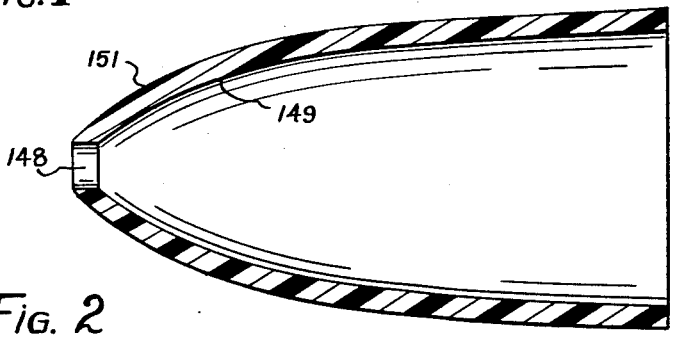
FIGURE 2 is a longitudinal sectional view of a finished radome embodying the invention.

The manner of using the winding machine or apparatus described to form a radome embodying the invention will now be explained. Assume a radome of the type illustrated in FIGURE 2 is to be formed wherein the wall thickness is substantially uniform. For example, if it is desired to have a wall with a thickness of .30 inch I find that by finish grinding the external surface of the wall the thickness can be held within a tolerance of plus or minus .002 inch. The external surface of mandrel 22 is shaped to conform to the desired internal surface of the radome wall and the mandrel effective length will be dependent upon the overall length of the radome, which in one case may be two feet and in another case seven feet. The fiber glass strand S (FIGURE 11) will usually comprise a plurality of rovings from several cakes of fiber glass which are mounted on independent spindles and the rovings are brought together to be immersed in a bath of liquid resin. I preferably use a thermosetting resin such as a polyester resin which will harden or cure relatively quickly upon the application of heat. The rovings pass under and over a plurality of rolls disposed in the bath which can be adjusted to give a desired drag or apply low tension to the strand as it is being wound. It was pointed out that the threads on screw 52 which effects movement of reciprocating block 49 are such that there is an advance of .05 inch axially by the needle eye 51 during one revolution of the mandrel. The strand S comprises a sufficient number of rovings so that as the strand flattens out while being wound its width will slightly exceed .05 inch insuring that successive windings will be tightly abutting or slightly overlapping. The winding head 48 is disposed at an extreme left position so that the needle eye 51 will be relatively close to the juncture of mandrel wall 25 with flange 20 which abuts the nose or small end of the mandrel although the eye 51 will be somewhat to the right of this juncture zone (FIGURE 4). For ease in positioning the winding head I preferably provide an over-running or one-directional clutch between inching motor 83 and threaded shaft 46 on which the winding head 48 is mounted. To effect movement of the winding head to the left I may provide a hand crank (not shown) for rotating shaft 46 in a reverse direction. Strand S after passing through eye 51 is manually wrapped several times around the mandrel in abutting relation with flange 20 and either tied or cemented to the mandrel. Since inching will not occur until a desired thickness is built up at the nose end of the mandrel, I wind this zone under manual control until this thickness is achieved. Flange 20 serves as a guide in determining the proper thickness. During this winding the heated mandrel and splined shaft 44 are caused to rotate by closing of switch 113 (FIGURE 15) but switch 120 is left open preventing automatic control of block 49. Manually operable switch 140 is used to move block 49 to the extreme left, and I find that if the strand S if fed from a position somewhat to the right, that the windings are pulled into the V-shaped pocket between flange 20 and wall 25 of the mandrel and block 49 can be manually controlled as desired to insure a level surface as successive layers are applied. When the desired thickness at this zone is achieved switch 140 is moved to neutral position and switch 120 is closed starting automatic operation. As previously explained rider 79 rides on the top layer of windings and inching of the winding head to the right will continuously occur whenever switch 76 contacts flange 68a.

It will be noted by reference to FIGURE 1 that each succeeding layer of windings is applied in a direction opposite to the preceding layer or that abutting layers have their windings sloping in opposite helical directions. For example, layer 140 was applied with block 49 moving to the right and the next layer 141 was applied with block 49 moving to the left. Also it will be noted that as successive layers are applied to traverse to the right or the travel required to have the windings contact the mandrel wall increases as the curvature of the mandrel wall tends to flatten out. This increasing traverse to the right continues until the windings contact flange 27 at the large end of the mandrel when the traverse decreases. As previously explained the desired traverse to the right for different axially spaced positions of the winding head can be controlled by properly shaping rim 91 of cam 92. The inching of the winding head 48, as described, causes the radome body to be built up of successive cylindrical fiber glass sections bonded to each other. The successive cylindrical sections are telescopically arranged, as shown in FIGS. 1 and 10, in partially overlapping relationship such that the rearward portion of one section is closely surrounded by the forward portion of the next larger diameter section. For illustration FIGURE 1 is somewhat exaggerated but in practice each succeeding layer of windings will overlap a major portion of the preceding layer and particularly beyond the nose zone.

As successive layers are applied any excess resin is forced radially outwardly and this resin can be periodically wiped. Since the windings are tightly abutting and the abutting layers are applied under tension it will be apparent that a high glass to resin ratio results inasmuch as glass has no tendency to absorb resin. This is highly desirable in a radome as previously pointed out. Although curing of the resin occurs during winding due to the heated mandrel I contemplate that it may be desirable to effect further curing in a bake oven or the like. After curing the external surface of the radome is finish ground to close tolerances and this removes the step form of the various layers (FIGURE 1) and results in a finished radome as illustrated in FIGURE 2. The opening 148 at the nose end of the radome is usually plugged with a button or the like.

Figure 3:
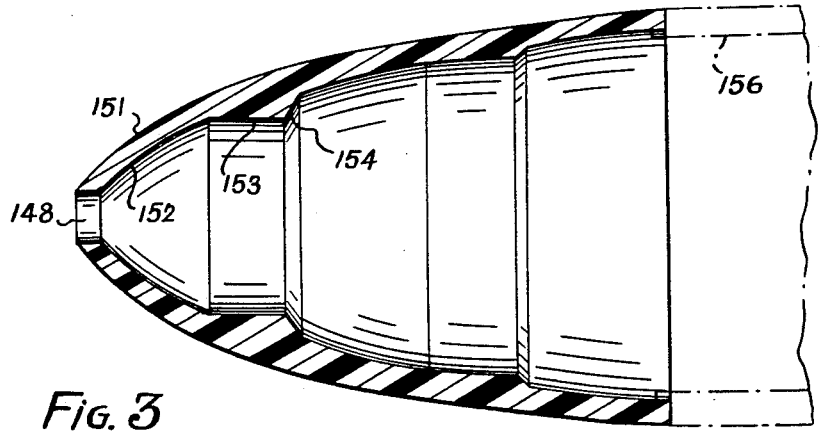
FIGURE 3 is a view similar to FIGURE 2 showing a modified radome wherein the internal surface of the radome wall is of generally step form.

Referring to FIGURES 2 and 3, the external surface 151 of the radome wall will be finish ground and the internal surface 149 may be finish ground if desired. The surface 149 is of smooth curved contour and the wall thickness between surfaces 149 and 151 (FIGURE 2) is of substantially uniform thickness in a radial direction. In FIGURE 3 the inner curved surface 152 corresponds to this portion of FIGURE 2, the surface 153 is straight with a slight draft permitting sliding of the molded radome to the left for removal from the mandrel, and surface 154 is sharply inclined. The step taper of the inner surface can continue as desired in the portion 156 in a longer radome.

It will now be apparent that I have provided a method and winding machine for forming a radome having a high glass to resin ratio and wherein the glass is uniformly distributed throughout the radome wall. As previously pointed out the ratio of glass to resin by weight can exceed three to one or the glass will constitute at least 75% of the radome wall.

I wish it to be understood that I do not desire to be limited to the exact details of construction shown and described, for obvious modifications will occur to persons skilled in the art.

What I claim is as follows:

1. A hollow body which is tapered toward one end comprising a wall formed of fiber glass windings bonded to each other, said wall being coaxial with respect to the major axis of the body and being formed at the smaller end of the body of cylindrical sections, each of said sections having inner and outer surfaces concentric with respect to said axis and being telescopically arranged with one section being overlapped for a portion of its length by the next adjacent larger section.

2. A paraboloid radome having a large diameter body portion and a tapered nose portion, said radome having a wall of successive helical wraps of a continuous fiber glass strand and the successive wraps being bonded to each other with a thermo-setting resin, the nose portion of the radome wall being coaxial with respect to the major axis of the radome and formed of annular sections and progressively increasing in diameter from the end of the nose portion towards the body portion of the radome, each of said annular sections in the nose portion having an inner surface in the form of a cylinder coaxial with the axis of the radome and an outer surface coaxial with the axis of the radome, said annular sections in the nose portion being telescopically arranged and offset lengthwise one with respect to the other with the rearward portion of the outer surface of one section surrounded by the forward portion of the next adjacent larger diameter section.

3. A radome according to claim 2 wherein the exterior surface of the nose portion is characterized by a ground surface and the interior surface of the nose portion extends parallel to said exterior surface to provide a uniform wall thickness formed of said annular sections.

4. That method of making a radome which comprises winding a continuous strand of fiber glass about a paraboloid form by winding a cylindrical section having inner and outer coaxial surfaces coaxial with the central axis of the paraboloid form and thereafter winding successive cylindrical sections having inner and outer coaxial surfaces concentric with the axis of the paraboloid form, with the inner surface of each succeeding cylindrical section overlapping a portion of the axial extent of the preceding cylindrical section, resin bonding all of the sections to each other, curing the resin and thereafter grinding the projecting portions of each of the overlapped successive cylindrical sections to form a smooth outer contour corresponding to the contour of said paraboloid form and providing a uniform wall thickness.

5. That method of making a radome consisting of resin bonded fiber glass which comprises winding a substantially continuous strand of fiber glass about a mandrel having a paraboloid form, starting such winding at the least diameter end of the paraboloid form, winding a section having an interior surface conforming to the exterior of the mandrel and an exterior surface in the form of a cylinder coaxial with the axis of the paraboloid form and thereafter winding a second section having an interior surface formed in part to conform to the surface of the mandrel and in part cylindrical and in contact with the exterior cylindrical surface of said first-named section, the exterior of the second-named section having a cylindrical surface coaxial with the axis of the paraboloid form and thereafter continuing the winding of successive cylindrical sections wherein the last section wound overlaps a portion of the axial extent of the preceding section, resin bonding the sections to each other, curing the resin and thereafter grinding the leading edge of each of the overlapping sections to provide an exterior surface corresponding generally to the surface of the mandrel to provide a uniform wall thickness.

References Cited in the file of this patent

UNITED STATES PATENTS

| | | |
|---|---|---|
| 1,268,905 | White | June 11, 1918 |
| 2,268,310 | Schweiter | Dec. 30, 1941 |
| 2,296,781 | Farny | Sept. 22, 1942 |
| 2,566,299 | Abbott | Sept. 4, 1951 |
| 2,594,693 | Smith | Apr. 29, 1952 |
| 2,718,583 | Noland et al. | Sept. 20, 1955 |
| 2,729,268 | Broughton et al. | Jan. 3, 1956 |
| 2,744,043 | Ramberg | May 1, 1956 |
| 2,747,649 | Reed | May 29, 1956 |
| 2,783,174 | Stephens | Feb. 26, 1957 |
| 2,837,456 | Parilla | June 3, 1958 |
| 2,843,153 | Young | July 15, 1958 |
| 2,905,578 | Rees et al. | Sept. 22, 1959 |

FOREIGN PATENTS

| | | |
|---|---|---|
| 721,692 | Great Britain | Jan. 12, 1955 |